(12) United States Patent
Sverdlov et al.

(10) Patent No.: US 9,444,655 B2
(45) Date of Patent: Sep. 13, 2016

(54) APPARATUS, METHOD AND SYSTEM OF SCRAMBLING A WIRELESS TRANSMISSION

(71) Applicant: Intel IP Corporation, Santa Clara, CA (US)

(72) Inventors: Alexander Sverdlov, Rehovot (IL); Tom Harel, Shefayim (IL); Michael Genossar, Modiin-Maccabim-Reut (IL)

(73) Assignee: INTEL IP CORPORATION, Santa Clara, CA (US)

( * ) Notice: Subject to any disclaimer, the term of this patent is extended or adjusted under 35 U.S.C. 154(b) by 188 days.

(21) Appl. No.: 14/224,397

(22) Filed: Mar. 25, 2014

(65) Prior Publication Data
US 2015/0282183 A1    Oct. 1, 2015

(51) Int. Cl.
*H04L 25/03* (2006.01)

(52) U.S. Cl.
CPC ......... *H04L 25/03* (2013.01); *H04L 25/03866* (2013.01)

(58) Field of Classification Search
CPC ........... H04L 25/03; H04L 2012/5672; H04L 2012/5673; H04W 72/0466
See application file for complete search history.

(56) References Cited

U.S. PATENT DOCUMENTS

| | | | | |
|---|---|---|---|---|
| 7,317,735 B1* | 1/2008 | Ojard | ................... | H04L 1/0046 370/470 |
| 7,808,404 B1* | 10/2010 | Yu | ......................... | G11B 20/10 341/107 |
| 2010/0113007 A1* | 5/2010 | Fukuoka | ................. | H04L 27/34 455/423 |
| 2012/0297271 A1 | 11/2012 | Sommer et al. | | |
| 2012/0314869 A1* | 12/2012 | Zhang | ................... | H04W 28/06 380/287 |
| 2014/0029453 A1* | 1/2014 | Trainin | ................. | H04W 24/10 370/252 |
| 2014/0072068 A1 | 3/2014 | Zhu et al. | | |
| 2014/0148118 A1* | 5/2014 | Lorenz | ............... | H04W 76/007 455/404.1 |

FOREIGN PATENT DOCUMENTS

EP    1432138    9/2005

OTHER PUBLICATIONS

International Search Report and Written Opinion for International Patent Application No. PCT/US2015/017445, mailed on May 28, 2015, 10 pages.
IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

(Continued)

*Primary Examiner* — Omer S Mian
(74) *Attorney, Agent, or Firm* — Shichrur & Co.

(57) ABSTRACT

Some demonstrative embodiments include devices, systems and methods of scrambling wireless transmissions. For example, an apparatus may include a selector to select a selected scrambling seed based on a number of codewords in a packet to be transmitted; and a scrambler to scramble bits of the packet based on a periodic sequence of scrambling bits, the sequence of scrambling bits being generated according to the selected scrambling seed.

24 Claims, 4 Drawing Sheets

(56) References Cited

OTHER PUBLICATIONS

IEEE Std 802.11ad™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.

Wi-Fi Alliance Technical Committee P2P Task Group; Wi-Fi Peer-to-Peer (P2P) Technical Specification; Version 1.2; Dec. 14, 2011; 160 pages.

Wireless Gigabit Alliance (WGA) Specifications; WiGig MAC and PHY Specification Version 1.1, Apr. 2011—Final Specification; 442 pages.

* cited by examiner

US 9,444,655 B2

APPARATUS, METHOD AND SYSTEM OF SCRAMBLING A WIRELESS TRANSMISSION

TECHNICAL FIELD

Embodiments described herein generally relate to scrambling wireless transmissions.

BACKGROUND

In some wireless communication networks, scrambling may be used, for example, to improve a Peak to Average Power Ratio (PAPR), and/or to reduce frequency domain spurs.

A wireless communication device may include a scrambler to scramble a frame using a scrambling code. The scrambling code may be randomly selected for every frame transmission.

In some situations the scrambling code may not be efficient, for example, if the scrambling code yields a sequence of all-zeros, all-ones, or other undesirable sequences.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
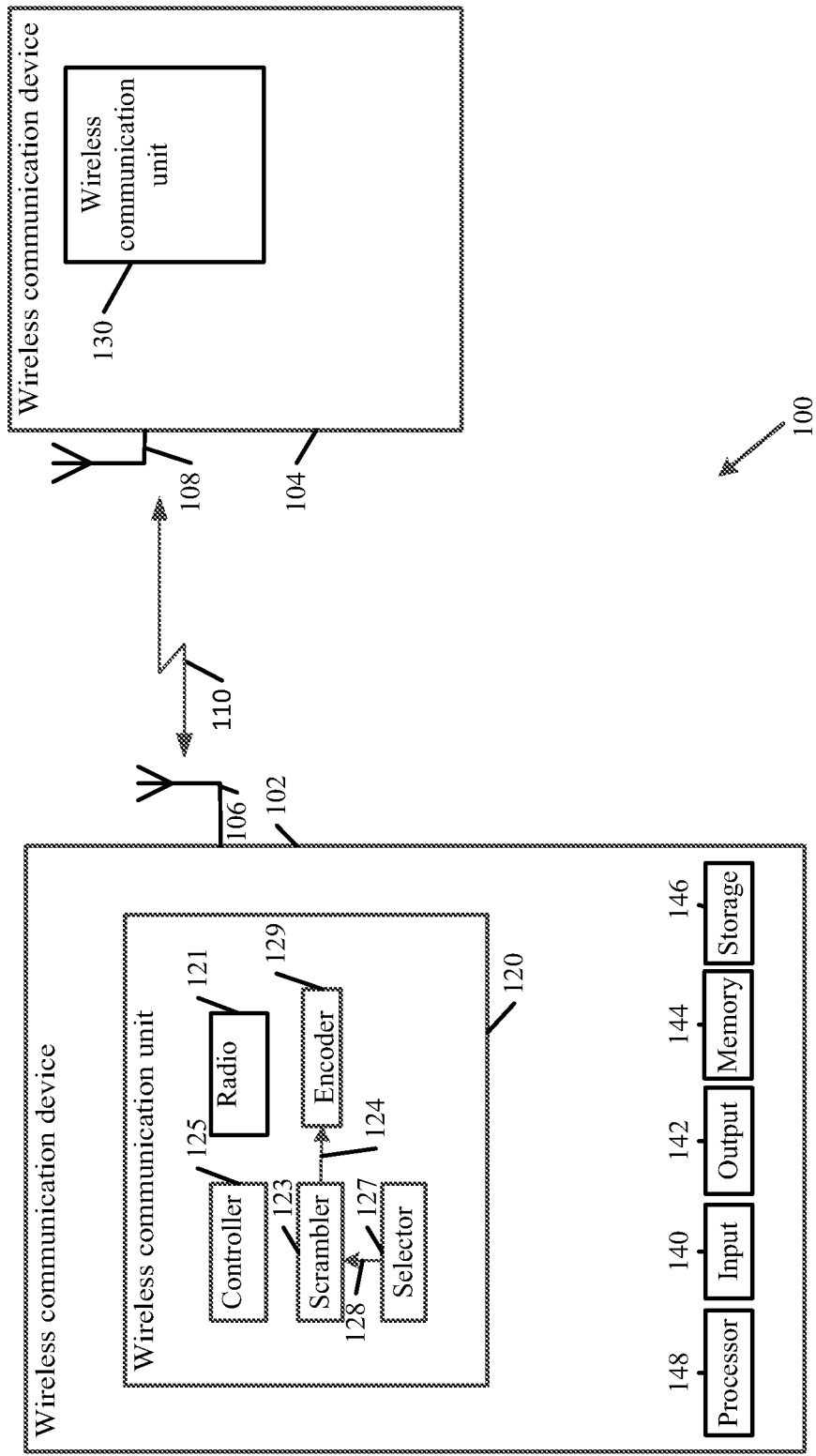
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, an Ultrabook™ computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar.* 29, 2012; *IEEE*802.11 *task group ac (TGac)* ("*IEEE*802.11-09/0308r12—*TGac Channel Model Addendum Document*"); *IEEE* 802.11 *task group ad (TGad)* (*IEEE P*802.11*ad*-2012, *IEEE Standard for Information Technology—Telecommunications and Information Exchange Between Systems—Local and Metropolitan Area Networks—Specific Requirements—Part* 11: *Wireless LAN Medium Access Control (MAC) and Physical Layer (PHY) Specifications—Amendment* 3: *Enhancements for Very High Throughput in the* 60 *GHz Band,* 28 *Dec.* 2012)) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version* 1.1, *April* 2011, *Final specification*) and/or future versions and/or derivatives thereof, devices and/or networks operating in accordance with existing Wireless Fidelity (WiFi) Alliance (WFA) Peer-to-Peer (P2P) specifications (*WiFi P2P technical specification, version 1.2, 2012*) and/or future versions and/or derivatives thereof, devices and/or networks operating in accordance with existing cellular specifications and/or protocols, e.g., 3rd Generation Partnership Project (3GPP), 3GPP Long Term Evolution (LTE), and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

The verb "communicating" may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

The phrases "directional multi-gigabit (DMG)" and "directional band" (DBand), as used herein, may relate to a frequency band wherein the Channel starting frequency is above 40 GHz.

The phrases "DMG STA" and "mmWave STA (mSTA)" may relate to a STA having a radio transmitter, which is operating on a channel that is within the DMG band.

The phrase "Peer-to-peer" (P2P) network, as used herein, may relate to a network in which a STA in the network can operate as a client or as a server for another STA in the network. The P2P network may allow shared access to resources, e.g., without a need for a central server.

Some demonstrative embodiments may be used in conjunction with a WLAN. Other embodiments may be used in conjunction with any other suitable wireless communication network, for example, a wireless area network, a "piconet", a WPAN, a WVAN and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Reference is now made to FIG. 1, which schematically illustrates a block diagram of a system 100, in accordance with some demonstrative embodiments.

As shown in FIG. 1, in some demonstrative embodiments, system 100 may include a wireless communication network including one or more wireless communication devices, e.g., wireless communication devices 102 and/or 104, capable of communicating content, data, information and/or signals over a wireless medium 110, for example, a radio channel, an IR channel, a RF channel, a Wireless Fidelity (WiFi) channel, and the like. One or more elements of system 100 may optionally be capable of communicating over any suitable wired communication links.

In some demonstrative embodiments, wireless communication devices 102 and/or 104 may include wireless communication units 120 and/or 130, respectively, to perform wireless communication between wireless communication devices 102 and/or 104 and/or with one or more other wireless communication devices, e.g., as described below.

In some demonstrative embodiments, wireless communication unit 120 and/or wireless communication 130 may include at least one radio 121. Radio 121 may include, for example, one or more wireless transmitters, receivers and/or transceivers able to send and/or receive wireless communication signals, RF signals, frames, blocks, transmission streams, packets, messages, data items, and/or data.

In some demonstrative embodiments, wireless communication unit 120 may include a controller 125 to control communications performed by radio 121. In one example, controller 125 may include a media access controller (MAC), a Physical Layer (PHY) controller, a baseband controller, and/or any other controller.

In some demonstrative embodiments, wireless communication units 120 and/or 130 may include or may be implemented as part of a wireless Network Interface Card (NIC), and the like.

In some demonstrative embodiments, wireless communication device 102 and/or wireless communication device 104 may include or may be implemented as part of, for example, a PC, a desktop computer, a mobile computer, a laptop computer, an Ultrabook™ computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, wireless communication devices 102 and 104 may form or communicate as part of a wireless local area network (WLAN).

In some demonstrative embodiments, wireless communication devices 102 and 104 may form or communicate as part of a WiFi network.

In some demonstrative embodiments, wireless communication devices 102, and/or 104 may perform the functionality of DMG STAB, e.g., wireless communication devices 120 and/or 130 may be configured to communicate over the DMG band.

In some demonstrative embodiments, wireless communication devices 102, and/or 104 may perform the functionality of WFA P2P devices.

In other demonstrative embodiments, wireless communication devices 102 and 104 may form or communicate as part of any other wireless communication network.

In some demonstrative embodiments, wireless communication devices 102 and/or 104 may include, for example, one or more of a processor 148, an input unit 140, an output unit 142, a memory unit 144, and a storage unit 146. Wireless communication devices 102 and/or 104 may optionally include other suitable hardware components and/or software components. In some demonstrative embodiments, some or all of the components of one or more of wireless communication devices 102 and/or 104 may be enclosed in a common housing or packaging, and may be interconnected or operably associated using one or more wired or wireless links. In other embodiments, components of one or more of wireless communication devices 102 and/or 104 may be distributed among multiple or separate devices.

Processor 148 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 148 executes instructions, for example, of an Operating System (OS) of wireless communication device 102 and/or of one or more suitable applications.

Input unit 140 includes, for example, a keyboard, a keypad, a mouse, a touch-screen, a touch-pad, a track-ball, a stylus, a microphone, or other suitable pointing device or input device. Output unit 142 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

Memory unit 144 includes, for example, a Random Access Memory (RAM), a Read Only Memory (ROM), a Dynamic RAM (DRAM), a Synchronous DRAM (SDRAM), a flash memory, a volatile memory, a non-volatile memory, a cache memory, a buffer, a short term memory unit, a long term memory unit, or other suitable memory units. Storage unit 146 includes, for example, a hard disk drive, a floppy disk drive, a Compact Disk (CD) drive, a CD-ROM drive, a DVD drive, or other suitable removable or non-removable storage units. Memory unit 144 and/or storage unit 146, for example, may store data processed by wireless communication device 102.

In some demonstrative embodiments, wireless communication devices 102 and 104 may include, or may be associated with, one or more antennas 106 and 108, respectively. Antennas 106 and/or 108 may include any type of antennas suitable for transmitting and/or receiving wireless communication signals, blocks, frames, transmission streams, packets, messages and/or data, e.g., over wireless medium 110. For example, antennas 106 and/or 108 may include any suitable configuration, structure and/or arrangement of one or more antenna elements, components, units, assemblies and/or arrays. Antennas 106 and/or 108 may include an antenna covered by a quasi-omni antenna pattern. For example, antennas 106 and/or 108 may include at least one of a phased array antenna, a single element antenna, a set of switched beam antennas, and the like. In some embodiments, antennas 106 and/or 108 may implement transmit and receive functionalities using separate transmit and receive antenna elements. In some embodiments, antennas 106 and/or 108 may implement transmit and receive functionalities using common and/or integrated transmit/receive elements.

In some demonstrative embodiments, wireless communication unit 120 and may transmit a packet to wireless communication unit 130.

In some demonstrative embodiments, the packet may include, for example, a PLCP (Physical Layer Convergence Procedure) Protocol Data Unit (PPDU). In other embodiments, the packet may include any other data unit and/or any other format and/or information.

Figure 2:
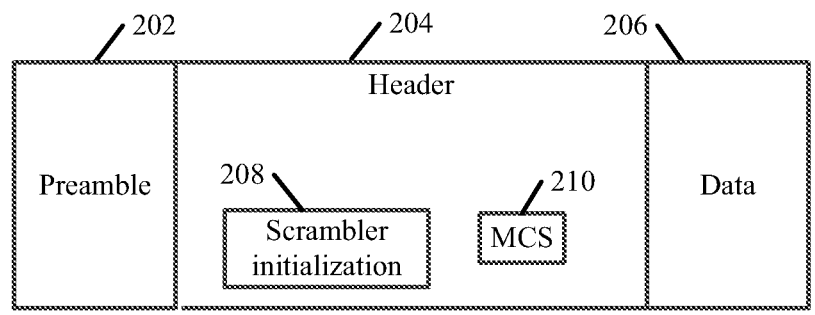
FIG. 2 is a schematic block diagram illustration of a packet, in accordance with some demonstrative embodiments.

Reference is made to FIG. 2, which schematically illustrates a packet 200, in accordance with some demonstrative embodiments. For example, wireless communication unit 120 (FIG. 1) may transmit packet 200, e.g., from device 102 (FIG. 1) to device 104 (FIG. 1).

In some demonstrative embodiments, packet 200 may include a PPDU. In one example, packet 200 may include a DMG PHY PPDU. In other embodiments, packet 200 may include any other wireless communication packet.

As shown in FIG. 2, packet 200 may include a preamble 202, followed by a header 204, and a data field 206. Packet 200 may include any other additional or alternative fields.

In some demonstrative embodiments, preamble 202 may include, for example, a Short Training Field (STF), a Channel Estimation (CE) field and/or any other field.

In some demonstrative embodiments, header 204 may include, for example, a PLCP header. Header 204 may include a scrambler initialization field 208, and a Modulation and Coding Scheme (MCS) field 210, e.g., as described below. Header 204 may include one or more other header fields.

Referring back to FIG. 1, in some demonstrative embodiments, wireless communication unit 120 may include a scrambler 123 to scramble packet 200 (FIG. 2) according to a predefined scrambling scheme, e.g., as described below.

In some demonstrative embodiments, wireless communication unit 120 may include an encoder 129 to encode packet 200 (FIG. 2) according to a predefined encoding scheme, e.g., as described below.

In some demonstrative embodiments, scrambler 123 and/or encoder 129 may be implemented as part of a PHY of wireless communication unit 120. For example, scrambler 123 and/or encoder 129 may be implemented as part of a DMG PHY of wireless communication unit 120. In other embodiments, scrambler 123 and/or encoder 129 may be implemented as any other elements of wireless communication unit 120.

In some demonstrative embodiments, scrambler 123 may generate a sequence of scrambled bits 124 of packet 200 (FIG. 2), for example, by scrambling bits of header fields of header 204 (FIG. 2), e.g., following scrambler initialization field 208 (FIG. 2), and bits of data field 206 (FIG. 2).

In some demonstrative embodiments, scrambler 123 may scramble the bits of packet 200 (FIG. 1) based on a periodic sequence of scrambling bits (also referred to as "scrambling sequence" or "scrambling code").

In some demonstrative embodiments, scrambler 123 may generate the sequence of scrambling bits based on a non-zero sequence of bits ("scrambling seed") 128, e.g., as described below.

In some demonstrative embodiments, scrambler 123 may scramble the bits of the packet 200 (FIG. 2) by performing a logical exclusive OR (XOR) between the bits of the packet and respective bits of the periodic scrambling sequence.

In some demonstrative embodiments, scrambling seed 128 may include a sequence of seven bits. According to these embodiments the periodic scrambling sequence may have a length of $(2^7-1)=127$ bits. In other embodiments, scrambling seed 128 may include any other number of bits.

In some demonstrative embodiments, scrambler 123 may generate the periodic scrambling sequence according to a predefined scrambling polynomial. In one example, the periodic scrambling sequence, denoted S(x), may be generated by the polynomial:

$$S(x)=x^7+x^4+1 \tag{1}$$

In other embodiments, scrambler 123 may generate the periodic scrambling sequence according to any other predefined polynomial, function and/or algorithm.

In some demonstrative embodiments, wireless communication unit 120 may include a selector 127 to select scrambling seed 128.

In some demonstrative embodiments, selector 127 may select scrambling seed 128 to be used for scrambling packet 200 (FIG. 2).

In some demonstrative embodiments, selector 127 may select scrambling seed 128 per packet to be transmitted by device 102, e.g., for each PPDU. For example, selector 127 may select a first scrambling seed 128 to scramble a first PPDU, and selector 127 may select a second scrambling seed 128 to scramble a second PPDU.

In some demonstrative embodiments, selector 127 may select scrambling seed in a pseudo random fashion, e.g., for each transmitted packet 200 (FIG. 2).

In some demonstrative embodiments, wireless communication unit may transmit the value of the scrambling seed 128 selected to scramble packet 200 (FIG. 2), as part of header 204 (FIG. 2). For example, scrambler initialization field 208 (FIG. 2) may include the scrambling seed 128 selected to scramble packet 200 (FIG. 2). Scrambler initialization field 208 (FIG. 2) may enable wireless communication unit 130 to determine the scrambling seed 128 to descramble packet 200 (FIG. 2).

In some demonstrative embodiments, encoder 129 may encode the scrambled bits 124 of packet 200 (FIG. 2) according to a Low Density Parity Check (LDPC) scheme, e.g., as described below. In other embodiments, encoder 129 may encode the scrambled bits 124 of packet 200 (FIG. 2) according to any other encoding scheme.

In some demonstrative embodiments, encoder 129 may generate a plurality of codewords (CWs) based on scrambled bits 124.

In some demonstrative embodiments, a codeword may include a first predefined number of information bits followed by a second predefined number of parity bits, e.g., as described below.

In some demonstrative embodiments, a codeword may have a length, denoted n, e.g., n=672, bits. For example, the codeword may include a predefined number, denoted k, e.g., k=336, of information bits followed by (n−k), e.g., 336, parity bits. In other embodiments, the codeword may include any other number of information bits and/or any other number of parity bits.

In some demonstrative embodiments, encoder 129 may encode the scrambled bits 124 into codewords according to a repetition rate, denoted ρ, of two, e.g., ρ=2. For example, encoder 129 may encode the scrambled bits 124 into code-words, such that a code-word includes a plurality of scrambled bits 124 and a scrambled repetition of the plurality of scrambled bits 124, e.g., as described below.

In some demonstrative embodiments, wireless communication unit 120 may implement the repetition rate of ρ=2, for example, to transmit a packet using a MCS index of 1. For example, wireless communication unit 120 may transmit packet 200 (FIG. 2) with the MCS index MCS=1. In one example, the MCS index MCS=1 may use the repetition rate of ρ=2 and a code rate of 0.5.

In some demonstrative embodiments, the MCS index MCS=1 may be used for Single Carrier (SC) transmission, e.g., a SC DMG transmission.

In some demonstrative embodiments, wireless communication unit 120 may implement the repetition rate of ρ=2, for example, to transmit a packet as a SC transmission, e.g., over a DMG channel. For example, wireless communication unit 120 may transmit packet 200 (FIG. 2) as a SC transmission with the repetition rate of $\rho=2$, e.g., over a DMG channel.

In some demonstrative embodiments, wireless communication unit 120 may be capable of transmitting packets using a plurality of different MCS indexes. In one example, wireless communication unit 120 may transmit a first packet, e.g., a SC packet, at a first MCS index, e.g., MCS=1, and a second packet, e.g., a SC packet, at a second MCS index, e.g., MCS>1.

In some demonstrative embodiments, wireless communication unit 120 may be capable of transmitting other types of packets, e.g., Orthogonal-Frequency-Division-Multiplexing (OFDM) packets, and the like, using any other MCS indexes.

In some demonstrative embodiments, MCS field 210 (FIG. 1) may include the MCS index of packet 200 (FIG. 2). In one example, wireless communication unit 120 may transmit packet 200 (FIG. 2) as a SC transmission, e.g., over a DMG channel, and MCS field 210 (FIG. 1) may include the MCS index MCS=1. According to this example, encoder 129 (FIG. 1) may encode scrambled bits 124 at a repetition rate of $\rho=2$ and a code rate of 0.5.

In some demonstrative embodiments, encoder 129 may encode the scrambled bits 124 into a codeword by concatenating a first plurality of L, e.g., L=k/2, scrambled bits 124, with a block of L zero bits, to produce a block sequence of 2L bits.

In some demonstrative embodiments, encoder 129 may determine a sequence of (n−2L) LDPC parity bits, e.g., (n−k) LDPC bits, for example, by applying an LDPC encoding to the block sequence of 2L bits, e.g., at a rate of 0.5.

In some demonstrative embodiments, encoder 129 may determine a second plurality of L re-scrambled bits (also referred to as "repetition bits"), for example, by re-scrambling the first plurality of L scrambled bits according to a predefined re-scrambling sequence.

In some demonstrative embodiments, the predefined re-scrambling sequence may result from a predefined re-scrambling seed. For example, the predefined re-scrambling sequence may be generated by initializing the predefined scrambling sequence with an all-one vector, e.g., using the re-scrambling seed "1111111".

In some demonstrative embodiments, encoder 129 may generate the codeword by concatenating the first plurality of L scrambled bits 124, followed by the second plurality of L re-scrambled repetition bits, followed by the (n−2L) LDPC parity bits.

Figure 3:
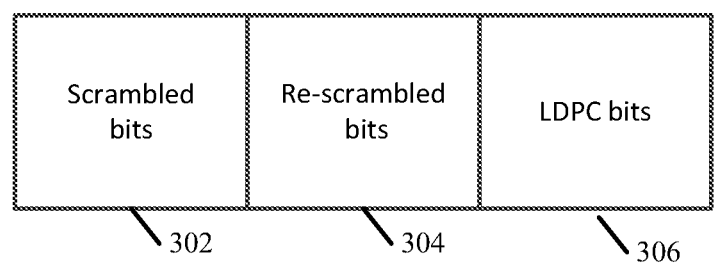
FIG. 3 is a schematic block diagram illustration of a codeword, in accordance with some demonstrative embodiments.

Reference is made to FIG. 3, which schematically illustrates a codeword 300, in accordance with some demonstrative embodiments. In some demonstrative embodiments, encoder 129 (FIG. 1) generate a sequence of codewords 300 by encoding respective blocks of L scrambled bits 124 (FIG. 1), e.g., as described above.

As shown in FIG. 3, codeword 300 may include a plurality of scrambled bits 302. For example, scrambled bits 302 may include a block of L scrambled bits 124 (FIG. 1), e.g., as described above.

As shown in FIG. 3, codeword 300 may include a plurality of re-scrambled bits 304, e.g., following scrambled bits 302. For example, re-scrambled bits 304 may include L re-scrambled bits. For example, encoder 129 (FIG. 1) may generate re-scrambled bits 304 by initializing scrambler 123 (FIG. 1) with the predefined re-scrambling seed to re-scramble bits 302, e.g., as described above. For example, encoder 129 (FIG. 1) may reinitialize scrambler 123 (FIG. 1) with the re-scrambling seed "1111111" for each codeword 300.

As shown in FIG. 3, codeword 300 may include a plurality of LDPC parity bits 306, e.g., following re-scrambled bits 304. For example, LDPC parity bits 306 may include (n−2L) LDPC parity bits. For example, encoder 129 (FIG. 1) may generate LDPC parity bits 306 by applying the LDPC encoding to the block sequence of 2L bits, e.g., as described above.

In one example, n=672 and L=168. According to this example, encoder 129 (FIG. 1) may encode a plurality of blocks of 168 scrambled bits 124 (FIG. 1) into a plurality of 672-bit codewords 300. For example, encoder 129 (FIG. 1) may concatenate a block of 168 scrambled bits 302 from scrambled bits 124 (FIG. 1) with a block of 168 zero bits, to produce a block sequence of 336 bits. Encoder 129 (FIG. 1) may determine a sequence of 336 LDPC parity bits 306, for example, by applying an LDPC encoding to the block sequence of 336 bits, e.g., at a rate of 0.5. Encoder 129 (FIG. 1) may determine 168 re-scrambled bits 304, for example, by re-scrambling the block of 168 scrambled bits 302 according to a re-scrambling sequence resulting from the scrambling seed "1111111". Encoder 129 (FIG. 1) may generate the 672-bit codeword 300 by concatenating the block of 168 scrambled bits 302, followed by the 168 re-scrambled bits 304, and followed by the 336 LDPC parity bits 306.

In some demonstrative embodiments, the re-scrambled bits 304 of codeword 300 may not be scrambled effectively, for example, if the scrambled bits 302 of the codeword 300 are generated with a scrambling sequence, which is identical to the predefined re-scrambling sequence.

For example, in such a situation, applying the re-scrambling code to scrambled bits 302 may result in the re-scrambling operation cancelling out the scrambling operation. As a result re-scrambled bits 304 may actually include non-scrambled bits, e.g., the original information bits of packet 200 (FIG. 2), prior to being scrambling by scrambler 123 (FIG. 1). Accordingly, the transmission of codeword 300 including the unscrambled bits may cause undesirable effects, such as, for example, frequency domain spurs, demodulation errors and the like.

Referring back to FIG. 1, in some demonstrative embodiments selector 127 may be configured to select the scrambling seed 128 to be used for scrambling packet 200 (FIG. 2), for example, be pseudo randomly selecting scrambling seed 128 for each packet 200 (FIG. 2).

In some demonstrative embodiments, the selected scrambling seed 128 may define the entire periodic scrambling sequence to be applied to all codewords 300 (FIG. 3) of the packet 200 (FIG. 2).

In some demonstrative embodiments, there may be a plurality of different predefined scrambling seeds, from which the scrambling seed 128 may be selected. For example, the number of the plurality of predefined scrambling seeds may be determined based on a length of scrambling seed 128. In one example, the plurality of predefined scrambling seeds may include $(2^7-1)=127$ different non-zero scrambling seeds, e.g., if scrambling seed 128 has a length of seven bits.

In some demonstrative embodiments, one or more scrambling seeds may define a scrambling sequence, which may result in one or more codewords ("the defective codewords") including the unscrambled bits, e.g., as described above.

In some demonstrative embodiments, randomly selecting scrambling seed 128 from the entire set of the predefined scrambling seeds may increase the probability of having defective codewords within a packet.

In some demonstrative embodiments, an impact of a defective codeword on packet 200 (FIG. 2) may increase, for example, as a length of packet 200 (FIG. 2) decreases. For example, a single defective codeword may have an impact of 20% on a packet including only 5 codewords, while the single defective codeword may have an impact of less than 1% on a packet including more than 100 codewords.

Accordingly, in some demonstrative embodiments it may be beneficial to ensure that packet 200 (FIG. 2) does not include defective codewords. For example, it may be beneficial to ensure that packets 200 (FIG. 2) including less than 127 codewords, for example, less than 100 codewords, e.g., less than 50 codewords, do not include defective codewords.

In some demonstrative embodiments, a location of a potential defective codeword within a packet may be based, for example, on the scrambling seed 128. For example, a first scrambling seed 128 may result in a defective codeword at a first location within a sequence of codewords, e.g., at a 50th codeword, a second scrambling seed 128 may result in a defective codeword at a second location, e.g., at a seventh codeword, a third scrambling seed 128 may result in a defective codeword at a third location, e.g., at a 70th codeword, and so on.

In some demonstrative embodiments, a particular scrambling seed may result in a defective codeword appearing in a first packet having a first number of codewords, while the same particular scrambling seed may not result in a defective codeword appearing in a second packet having a second number of codewords. For example, if a packet includes 30 codewords, the first and third scrambling seeds may not result in a defective codeword in the packet, while the second scrambling seed may result in the seventh codeword of the packet being defective.

In some demonstrative embodiments, selector 127 may be configured to select scrambling seed 128 based on the number of codewords to be transmitted in packet 200 (FIG. 2), e.g., as described below.

In some demonstrative embodiments, selector 127 may be configured to select scrambling seed 128, in a way, which may ensure that, at least a sequence of a predefined number, denoted N, of codewords 300 (FIG. 3), will not include a defective codeword.

In some demonstrative embodiments, selector 127 may be configured to select scrambling seed 128, in a way, which may ensure that the scrambled bits 302 (FIG. 3) of each codeword 300 (FIG. 3) of the N codewords are scrambled with a scrambling sequence, which is different from the predefined re-scrambling sequence.

In some demonstrative embodiments, the periodic nature of the scrambling sequence may enable determining whether or not a particular scrambling seed 128 may result in scrambling bits 302 (FIG. 3) of any of the N codewords 300 (FIG. 3) being scrambled with a scrambling sequence identical to the predefined re-scrambling sequence.

In some demonstrative embodiments, the periodic scrambling sequence resulting from the scrambling seed 128 may include a plurality of subsequences of scrambling bits, such that each subsequence of scrambling bits may be applied to a respective codeword 300 (FIG. 3).

In some demonstrative embodiments, selector 127 may be configured to select scrambling seed 128, such that each sub-sequence corresponding to a respective codeword 300 of the N codewords is different from the predefined re-scrambling sequence.

In some demonstrative embodiments, ensuring that a beginning of a codeword 300 (FIG. 3) is not being scrambled with a sequence of scrambling bits, which is identical to the predefined re-scrambling seed, may enable ensuring that the scrambled bits 302 (FIG. 3) of the codeword are being scrambled with a scrambling sequence different from the re-scrambling sequence.

In some demonstrative embodiments, selector 127 may be configured to select scrambling seed 128, such that each sub-sequence corresponding to a respective codeword 300 of the N codewords begins with a sequence of bits different from the re-scrambling seed.

For example, if the re-scrambling seed includes the seven-bit sequence "1111111", selector 127 may be configured to select scrambling seed 128, such that each sub-sequence corresponding to a respective codeword 300 (FIG. 3) of the N codewords begins with a sequence of bits, which is different from the sequence "1111111".

In some demonstrative embodiments, the value of N may be less than $(2^m-1)$, wherein m denotes the bit-length of scrambling seed 128. For example, the value of N may be less than 127, if scrambling seed 128 includes 7 bits.

In some demonstrative embodiments, selector 127 may be configured to select, e.g., pseudo randomly select, the scrambling seed 128 for a packet from a selected plurality of potential scrambling seeds ("the set of allowed scrambling seeds"), e.g., instead of selecting the scrambling seed 128 from the entire set of predefined scrambling seeds.

In some demonstrative embodiments, selector 127 may select the set of allowed scrambling seeds to include only scrambling seeds, which may not result in a defective codeword in packet 200 (FIG. 2), e.g., when packet 200 (FIG. 2) includes less than $(2^m-1)$ codewords.

In some demonstrative embodiments, selector 127 may select the set of allowed scrambling seeds from the entire plurality of predefined scrambling seeds based, for example, on the number of codewords to be transmitted in packet 200 (FIG. 2).

In some demonstrative embodiments, selector 127 may select to include a particular scrambling seed in the set of allowed scrambling seeds, for example, only if the particular scrambling seed may result in a scrambling sequence of "1111111" at a beginning of an M-th codeword, and M>N. Selector 127 may select not to include the particular scrambling seed in the set of allowed scrambling seeds, for example, if M≤N.

In some demonstrative embodiments, selector 127 may determine the value of N based on a length of packet 200 (FIG. 2). For example, selector 127 may determine the value of N to be equal to or greater than the number of codewords in packet 200 (FIG. 2). Additionally or alternatively, selector 127 may determine the value of N based on any suitable packet statistics and/or any other criteria.

In some demonstrative embodiments, different sets of allowed scrambling seeds may be determined with respect to different values of N.

In one example, a different set of allowed scrambling seeds may be defined with respect to each different value of N. For example, q different sets of allowed scrambling seeds may be determined, e.g., if N may be between the values 1 . . . q.

In another example, a set of allowed scrambling seeds may be defined with respect to a range of values of N. For example, a first set of allowed scrambling seeds may be defined with respect to a first range, e.g., 1≤N<10, a second set of allowed scrambling seeds may be defined with respect to a second range, e.g., 11≤N<20, and so on.

In some demonstrative embodiments, the sets of allowed scrambling seeds may be determined offline and stored in device 102.

In one example, device 102 may store a Look-up-Table (LUT) including the sets of allowed scrambling seeds associated with respective values of N.

According to this example, selector 127 may determine the value of N corresponding to a number of codewords of packet 200 (FIG. 2). Selector 127 may select from the LUT the set of allowed scrambling seeds corresponding to the value of N. Selector 127 may pseudo randomly select scrambling seed 128 from the selected set of allowed scrambling seeds.

In some demonstrative embodiments, selector 127 may be configured to determine the set of allowed scrambling seeds to be used with respect to a particular packet, e.g., on the fly.

For example, selector 127 may determine the value of N corresponding to a number of codewords of packet 200 (FIG. 2). Selector 127 may determine the set of allowed scrambling seeds corresponding to the value of N, and pseudo randomly select scrambling seed 128 from the selected set of allowed scrambling seeds.

In some demonstrative embodiments, the set of allowed scrambling seeds corresponding to a value of N may be determined, for example, by iterating over the entire plurality of predefined scrambling seeds, and, for each scrambling seed, determining to include the scrambling seed in the set of allowed scrambling seeds, e.g., only if M>N.

In some demonstrative embodiments, the set of allowed scrambling seeds (denoted "scram_seed_allowed_subset") corresponding to a particular value of N may be determined, for example, based on the following pseudo code, e.g., if the scrambling seed includes a seven-bit scrambling seed:

```
scram_seed_allowed_subset = [ ];
for scram_seed = 1:127
    cw_idx = calc_cw_idx_problematic_occurrence(scram_seed);
    if cw_idx > = N
        scram_seed_allowed_subset =
        [scram_seed_allowed_subset scram_seed];
    end
end
return scram_seed_allowed_subset;
``` wherein the operation calc_cw_idx_problematic_occurrence(scram_seed) denotes an operation of determining the value of M, at which a defective codeword will result from the scrambling seed scram_seed.

In one example, for the value N=64, the set of allowed scrambling seeds, denoted A, may include the scrambling seeds A={1 3 6 8 9 11 15 17 18 19 21 23 24 27 29 31 33 35 36 37 39 40 42 45 47 48 49 50 51 52 55 56 58 59 60 61 64 66 67 75 78 81 82 84 87 88 89 90 91 94 97 101 102 103 106 113 115 117 122 123 124 125 126}. The set A may ensure that, if scrambling seed 128 is selected from the set A, then the scrambling seed 128 may not result in a defective codeword for any packet including up to 64 codewords.

In some demonstrative embodiments, wireless communication unit 120 may select between selecting the scrambling seed 128 from the set of allowed scrambling seeds, and selecting the scrambling seed 128 from the entire plurality of predefined scrambling seeds.

In some demonstrative embodiments, wireless communication unit 120 may select the scrambling seed 128 from the set of allowed scrambling seeds, for example, to scramble SC packets, e.g., SC DMG packets, having an MCS index of one.

In some demonstrative embodiments, wireless communication unit 120 may select the scrambling seed 128 from the set of allowed scrambling seeds, for example, to scramble SC packets, e.g., SC DMG packets, having repetition rate of two.

In some demonstrative embodiments, wireless communication unit 120 may select the scrambling seed 128 from the set of allowed scrambling seeds, for example, to scramble SC packets, e.g., SC DMG packets, having a length of less than 127 codewords, for example, less than 100 codewords, e.g., less than 50 codewords, or less than ten codewords.

In some demonstrative embodiments, wireless communication unit 120 may select the scrambling seed 128 from the entire plurality of predefined scrambling seeds, for example, to scramble OFDM packets.

In some demonstrative embodiments, wireless communication unit 120 may select the scrambling seed 128 from the entire plurality of predefined scrambling seeds, for example, to scramble SC packets, e.g., SC DMG packets, having an MCS index greater than one.

In some demonstrative embodiments, wireless communication unit 120 may select the scrambling seed 128 from the entire plurality of predefined scrambling seeds, for example, to scramble long SC packets, for example, packets including more than 127 codewords, for example, more than 150 codewords.

In other embodiments, wireless communication unit 120 may implement any other additional or alternative criterion to select between selecting the scrambling seed 128 from the set of allowed scrambling seeds, and selecting the scrambling seed 128 from the entire plurality of predefined scrambling seeds.

In one example, selector 127 may select scrambling seed 128 to scramble a first packet, based on the number of codewords of a first packet, for example, if the first packet is to be transmitted with a repetition factor of two. Selector 127 may select scrambling seed 128 to scramble a second packet, independent of the number of codewords of the second packet, for example, if the second packet is to be transmitted with a repetition factor of one.

Figure 4:
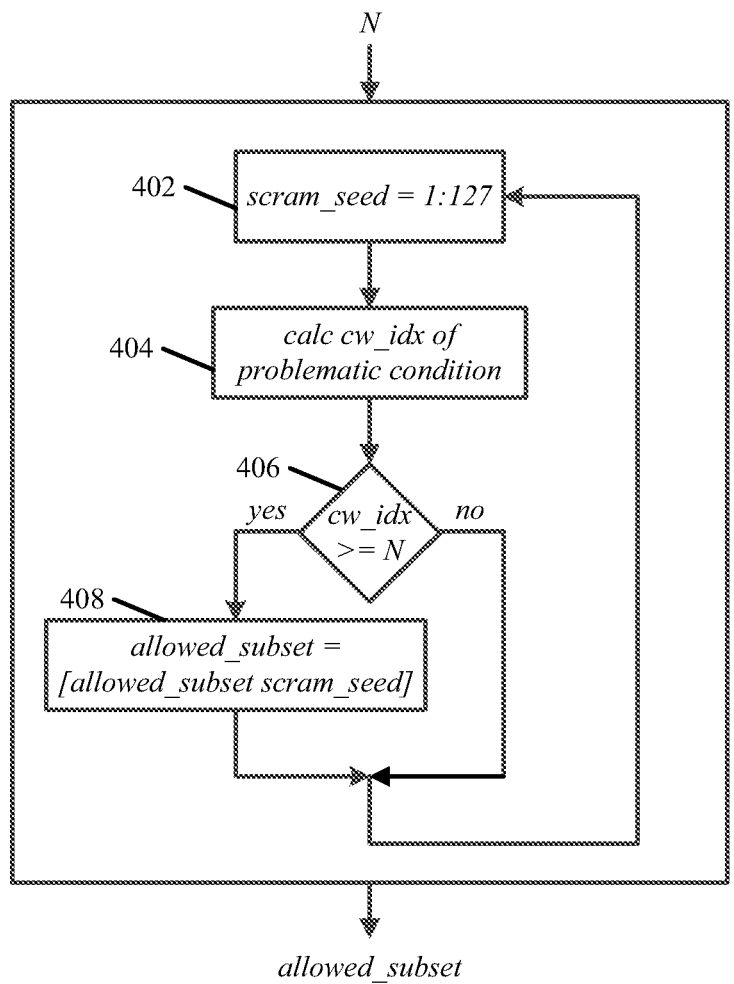
FIG. 4 is a schematic flow-chart illustration of a method of selecting a set of allowed scrambling seeds from a set of scrambling seeds, in accordance with some demonstrative embodiments.

FIG. 4 is a schematic flow-chart illustration of a method of selecting a set of allowed scrambling seeds from a set of scrambling seeds, in accordance with some demonstrative embodiments.

In one example, one or more of the operations of the method of FIG. 4 may be performed by selector 127 (FIG. 1), e.g., on the fly, to determine the set of allowed scrambling seeds corresponding to a particular value of N.

In another example, one or more of the operations of the method of FIG. 4 may be performed, e.g., offline, for example, to determine a plurality of different sets of allowed scrambling seeds corresponding to a respective plurality of values of N. The plurality of different sets of allowed scrambling seeds may be stored by device 102 (FIG. 2).

As indicated at block 402, the method may include iterating over a plurality of predefined scrambling seeds, for example, over 127 scrambling seeds, e.g., if scrambling seed 128 (FIG. 1) includes seven bits.

As indicated at block 404, the method may include determining for a particular scrambling seed the value of M (also denoted cw_idx), at which a defective codeword will result from the particular scrambling seed.

As indicated at block 406, the method may include comparing the value of M to the value of N.

As indicated at block 408, the method may include including the particular scrambling seed in the set of allowed scrambling seeds, for example, only if M≥N.

Figure 5:
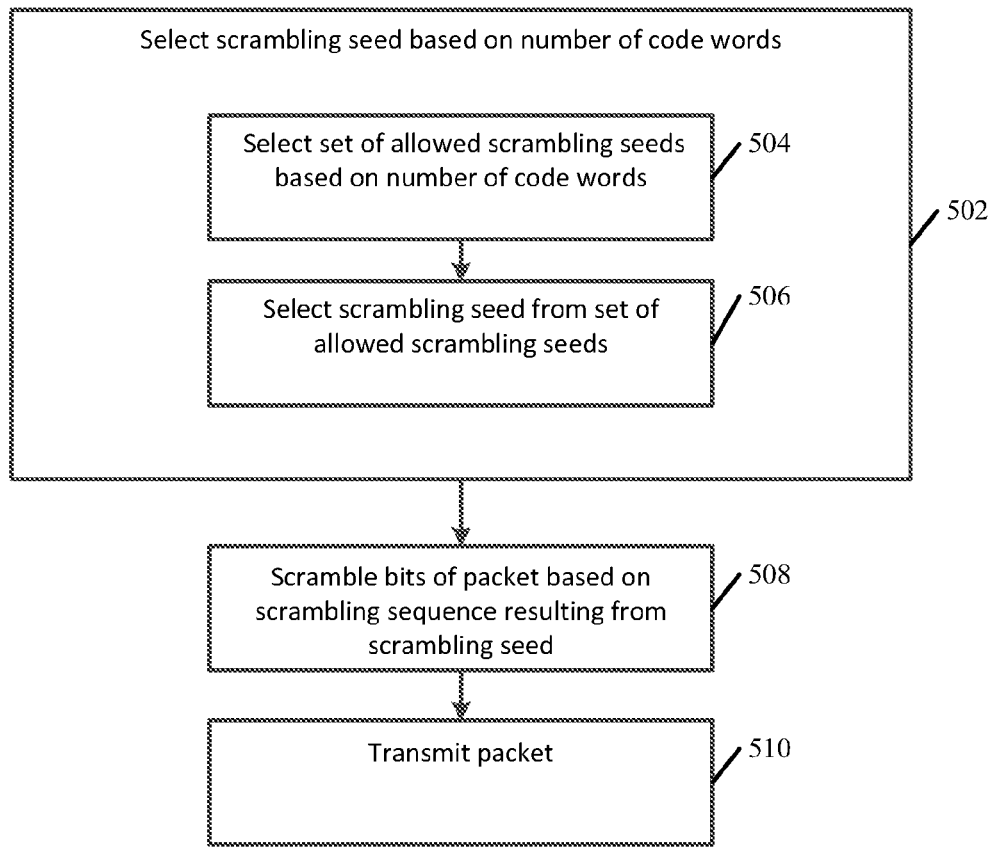
FIG. 5 is a schematic flow-chart illustration of a method of scrambling a wireless transmission, in accordance with some demonstrative embodiments.

FIG. 5 is a schematic flow-chart illustration of a method of scrambling a wireless transmission, in accordance with some demonstrative embodiments. In some demonstrative embodiments, one or more of the operations of the method of FIG. 5 may be performed by a wireless communication device, e.g., device 102 (FIG. 1), a wireless communication unit, e.g., wireless communication unit 120 (FIG. 1), a scrambler, e.g., scrambler 123 (FIG. 1), and/or a selector, e.g., selector 127 (FIG. 1).

As indicated at block 502, the method may include selecting a selected scrambling seed based on a number of codewords in a packet. For example, selector 127 (FIG. 1) may select scrambling seed 128 (FIG. 1) based on a number of codewords 300 (FIG. 3) to be included in packet 200 (FIG. 2), e.g., as described above.

As indicated at block 504, the method may include selecting a plurality of allowed scrambling seeds based on the number of codewords in the packet. For example, selector 127 (FIG. 1) may select the set of allowed scrambling seeds based on the number of codewords 300 (FIG. 3) to be included in packet 200 (FIG. 2), e.g., as described above.

As indicated at block 506, the method may include selecting the scrambling seed from the plurality of allowed scrambling seeds. For example, selector 127 (FIG. 1) may select, e.g., pseudo randomly select, scrambling seed 128 (FIG. 1) from the set of allowed scrambling seeds, e.g., as described above.

As indicated at block 508, the method may include scrambling bits of the packet based on a periodic sequence of scrambling bits, which is generated according to the selected scrambling seed. For example, selector 127 (FIG. 1) may scramble codewords 300 (FIG. 3) of packet 200 (FIG. 2) based on a scrambling code generated according to the selected scrambling seed 128 (FIG. 1), e.g., as described above.

As indicated at block 510, the method may include transmitting the packet. For example, radio 121 (FIG. 1) may transmit packet 200 (FIG. 1), e.g., as described above.

In some demonstrative embodiments, the operations of blocks 502, 504, 506, 508 and/or 510 may be performed to transmit the packet with a repetition rate of two.

In some demonstrative embodiments, the operations of blocks 502, 504, 506, 508 and/or 510 may be performed to transmit the packet as part of a SC transmission, e.g., over a DMG channel.

In some demonstrative embodiments, the operations of blocks 502, 504, 506, 508 and/or 510 may be performed to transmit the packet with a MCS index of one, e.g., over a DMG channel.

For example, selector 127 (FIG. 1) may be configured to select the scrambling seed 128 (FIG. 1) based on the number of codewords in packet 200 (FIG. 2), for example, when wireless communication unit 120 (FIG. 1) is to transmit packet 200 (FIG. 1) as part of a SC transmission with an MCS index of one, e.g., over a DMG channel.

Figure 6:
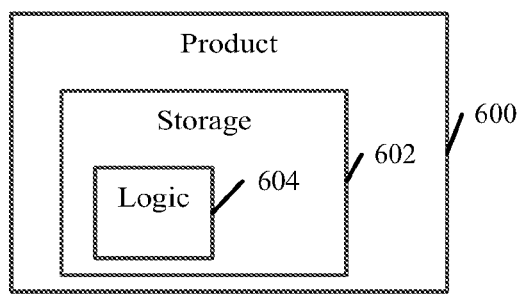
FIG. 6 is a schematic illustration of a product of manufacture, in accordance with some demonstrative embodiments.

Reference is made to FIG. 6, which schematically illustrates an article of manufacture 600, in accordance with some demonstrative embodiments. Article 600 may include a non-transitory machine-readable storage medium 602 to store logic 604, which may be used, for example, to perform at least part of the functionality of devices 102 and/or 104 (FIG. 1), wireless communication units 120 and/or 130 (FIG. 1), controller 125 (FIG. 1), selector 127 (FIG. 1), and/or encoder 129 (FIG. 1), and/or to perform one or more of the operations of the method of FIG. 4 and/or FIG. 5. The phrase "non-transitory machine-readable medium" is directed to include all computer-readable media, with the sole exception being a transitory propagating signal.

In some demonstrative embodiments, article 600 and/or machine-readable storage medium 602 may include one or more types of computer-readable storage media capable of storing data, including volatile memory, non-volatile memory, removable or non-removable memory, erasable or non-erasable memory, writeable or re-writeable memory, and the like. For example, machine-readable storage medium 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a wireless communication unit comprising a selector to select a selected scrambling seed based on a number of codewords in a packet to be transmitted by the wireless communication unit; and a scrambler to scramble bits of the packet based on a periodic sequence of scrambling bits, the sequence of scrambling bits being generated according to the selected scrambling seed.

Example 2 includes the subject matter of Example 1, and optionally, wherein a codeword of the packet includes a first plurality of scrambled bits followed by a second plurality of re-scrambled bits, the first plurality of scrambled bits including a plurality of information bits being scrambled by scrambling bits of the sequence of scrambling bits, the second plurality of re-scrambled bits including the first plurality of scrambled bits being scrambled by a predefined re-scrambling sequence resulting from a predefined re-scrambling seed.

Example 3 includes the subject matter of Example 2, and optionally, wherein the sequence of scrambling bits includes a plurality of subsequences of scrambling bits, each subsequence of scrambling bits to be applied to a respective codeword of the codewords, and wherein each subsequence of scrambling bits is different from the predefined re-scrambling sequence.

Example 4 includes the subject matter of any one of Examples 1-3, and optionally, wherein the sequence of scrambling bits includes a plurality of subsequences of scrambling bits, each subsequence of scrambling bits to be applied to a respective codeword of the codewords, and wherein a beginning of each subsequence of scrambling bits is different from the sequence "1111111".

Example 5 includes the subject matter of any one of Examples 1-4, and optionally, wherein the selector is to select a set of allowed scrambling seeds based on the number of the codewords, and to select the selected scrambling seed from the set of allowed scrambling seeds.

Example 6 includes the subject matter of Example 5, and optionally, wherein the selector is to select the set of allowed scrambling seeds from a plurality of predefined scrambling seeds.

Example 7 includes the subject matter of any one of Examples 1-6, and optionally, wherein the wireless communication unit is to transmit a header of the packet, the header having a scrambler initialization field including the selected scrambling seed.

Example 8 includes the subject matter of any one of Examples 1-7, and optionally, wherein the wireless communication unit is to transmit the packet as a single-carrier transmission with a repetition factor of two over a directional multi-gigabit (DMG) channel.

Example 9 includes the subject matter of Example 8, and optionally, wherein the wireless communication unit is to transmit another packet with a repetition factor of one, and wherein the selector is to select for the another packet a scrambling seed independent of a number of codewords in the another packet.

Example 10 includes the subject matter of any one of Examples 1-9, and optionally, wherein the wireless communication unit is to transmit the packet with a Modulation and Coding Scheme (MCS) index of one over a directional multi-gigabit (DMG) channel.

Example 11 includes the subject matter of Example 10, and optionally, wherein the wireless communication unit is to transmit another packet with a MCS index different from one, and wherein the selector is to select for the another packet a scrambling seed independent of a number of codewords in the another packet.

Example 12 includes the subject matter of any one of Examples 1-11, and optionally, wherein the packet comprises a directional multi-gigabit (DMG) packet, wherein the selected scrambling seed comprises seven bits, and wherein the periodic sequence of scrambling bits has a length of 127 bits.

Example 13 includes a wireless communication system comprising at least one antenna; a memory; a processor; and a wireless communication unit to select a selected scrambling seed based on a number of codewords in a packet to be transmitted by the wireless communication unit, and to scramble bits of the packet based on a periodic sequence of scrambling bits, the sequence of scrambling bits being generated according to the selected scrambling seed.

Example 14 includes the subject matter of Example 13, and optionally, wherein a codeword of the packet includes a first plurality of scrambled bits followed by a second plurality of re-scrambled bits, the first plurality of scrambled bits including a plurality of information bits being scrambled by scrambling bits of the sequence of scrambling bits, the second plurality of re-scrambled bits including the first plurality of scrambled bits being scrambled by a predefined re-scrambling sequence resulting from a predefined re-scrambling seed.

Example 15 includes the subject matter of Example 14, and optionally, wherein the sequence of scrambling bits includes a plurality of subsequences of scrambling bits, each subsequence of scrambling bits to be applied to a respective codeword of the codewords, and wherein each subsequence of scrambling bits is different from the predefined re-scrambling sequence.

Example 16 includes the subject matter of any one of Examples 13-15, and optionally, wherein the sequence of scrambling bits includes a plurality of subsequences of scrambling bits, each subsequence of scrambling bits to be applied to a respective codeword of the codewords, and wherein a beginning of each subsequence of scrambling bits is different from the sequence "1111111".

Example 17 includes the subject matter of any one of Examples 13-16, and optionally, wherein the wireless communication unit is to select a set of allowed scrambling seeds based on the number of the codewords, and to select the selected scrambling seed from the set of allowed scrambling seeds.

Example 18 includes the subject matter of Example 17, and optionally, wherein the wireless communication unit is to select the set of allowed scrambling seeds from a plurality of predefined scrambling seeds.

Example 19 includes the subject matter of any one of Examples 13-18, and optionally, wherein the wireless communication unit is to transmit a header of the packet, the header having a scrambler initialization field including the selected scrambling seed.

Example 20 includes the subject matter of any one of Examples 13-19, and optionally, wherein the wireless communication unit is to transmit the packet as a single-carrier transmission with a repetition factor of two over a directional multi-gigabit (DMG) channel.

Example 21 includes the subject matter of Example 20, and optionally, wherein the wireless communication unit is to transmit another packet with a repetition factor of one, and wherein the wireless communication unit is to select for the another packet a scrambling seed independent of a number of codewords in the another packet.

Example 22 includes the subject matter of any one of Examples 13-21, and optionally, wherein the wireless communication unit is to transmit the packet with a Modulation and Coding Scheme (MCS) index of one over a directional multi-gigabit (DMG) channel.

Example 23 includes the subject matter of Example 22, and optionally, wherein the wireless communication unit is to transmit another packet with a MCS index different from one, and wherein the wireless communication unit is to select for the another packet a scrambling seed independent of a number of codewords in the another packet.

Example 24 includes the subject matter of any one of Examples 13-23, and optionally, wherein the selected scrambling seed comprises seven bits, wherein the packet comprises a directional multi-gigabit (DMG) packet, and wherein the periodic sequence of scrambling bits has a length of 127 bits.

Example 25 includes a method of wireless communication, the method comprising selecting a selected scrambling seed based on a number of codewords in a packet; scrambling bits of the packet based on a periodic sequence of scrambling bits, the sequence of scrambling bits being generated according to the selected scrambling seed; and transmitting the packet.

Example 26 includes the subject matter of Example 25, and optionally, wherein a codeword of the packet includes a first plurality of scrambled bits followed by a second plurality of re-scrambled bits, the first plurality of scrambled bits including a plurality of information bits being scrambled by scrambling bits of the sequence of scrambling bits, the second plurality of re-scrambled bits including the first plurality of scrambled bits being scrambled by a predefined re-scrambling sequence resulting from a predefined re-scrambling seed.

Example 27 includes the subject matter of Example 26, and optionally, wherein the sequence of scrambling bits includes a plurality of subsequences of scrambling bits, each subsequence of scrambling bits to be applied to a respective codeword of the codewords, and wherein each subsequence of scrambling bits is different from the predefined re-scrambling sequence.

Example 28 includes the subject matter of any one of Examples 25-27, and optionally, wherein the sequence of scrambling bits includes a plurality of subsequences of scrambling bits, each subsequence of scrambling bits to be applied to a respective codeword of the codewords, and wherein a beginning of each subsequence of scrambling bits is different from the sequence "1111111".

Example 29 includes the subject matter of any one of Examples 25-28, and optionally, comprising selecting a set of allowed scrambling seeds based on the number of the codewords, and selecting the selected scrambling seed from the set of allowed scrambling seeds.

Example 30 includes the subject matter of Example 29, and optionally, comprising selecting the set of allowed scrambling seeds from a plurality of predefined scrambling seeds.

Example 31 includes the subject matter of any one of Examples 25-30, and optionally, comprising transmitting a header of the packet, the header having a scrambler initialization field including the selected scrambling seed.

Example 32 includes the subject matter of any one of Examples 25-31, and optionally, comprising transmitting the packet as a single-carrier transmission with a repetition factor of two over a directional multi-gigabit (DMG) channel.

Example 33 includes the subject matter of Example 32, and optionally, comprising selecting for another packet a scrambling seed independent of a number of codewords in the another packet, and transmitting the another packet with a repetition factor of one.

Example 34 includes the subject matter of any one of Examples 25-33, and optionally, comprising transmitting the packet with a Modulation and Coding Scheme (MCS) index of one over a directional multi-gigabit (DMG) channel.

Example 35 includes the subject matter of Example 34, and optionally, comprising selecting for another packet a scrambling seed independent of a number of codewords in the another packet, and transmitting the another packet with a MCS index different from one.

Example 36 includes the subject matter of any one of Examples 25-35, and optionally, wherein the selected scrambling seed comprises seven bits, wherein the packet comprises a directional multi-gigabit (DMG) packet, and wherein the periodic sequence of scrambling bits has a length of 127 bits.

Example 37 includes a product including a non-transitory storage medium having stored thereon instructions that, when executed by a machine, result in selecting a selected scrambling seed based on a number of codewords in a packet; scrambling bits of the packet based on a periodic sequence of scrambling bits, the sequence of scrambling bits being generated according to the selected scrambling seed; and transmitting the packet.

Example 38 includes the subject matter of Example 37, and optionally, wherein a codeword of the packet includes a first plurality of scrambled bits followed by a second plurality of re-scrambled bits, the first plurality of scrambled bits including a plurality of information bits being scrambled by scrambling bits of the sequence of scrambling bits, the second plurality of re-scrambled bits including the first plurality of scrambled bits being scrambled by a predefined re-scrambling sequence resulting from a predefined re-scrambling seed.

Example 39 includes the subject matter of Example 38, and optionally, wherein the sequence of scrambling bits includes a plurality of subsequences of scrambling bits, each subsequence of scrambling bits to be applied to a respective codeword of the codewords, and wherein each subsequence of scrambling bits is different from the predefined re-scrambling sequence.

Example 40 includes the subject matter of any one of Examples 37-39, and optionally, wherein the sequence of scrambling bits includes a plurality of subsequences of scrambling bits, each subsequence of scrambling bits to be applied to a respective codeword of the codewords, and wherein a beginning of each subsequence of scrambling bits is different from the sequence "1111111".

Example 41 includes the subject matter of any one of Examples 37-40, and optionally, wherein the instructions result in selecting a set of allowed scrambling seeds based on the number of the codewords, and selecting the selected scrambling seed from the set of allowed scrambling seeds.

Example 42 includes the subject matter of Example 41, and optionally, wherein the instructions result in selecting the set of allowed scrambling seeds from a plurality of predefined scrambling seeds.

Example 43 includes the subject matter of any one of Examples 37-42, and optionally, wherein the instructions result in transmitting a header of the packet, the header having a scrambler initialization field including the selected scrambling seed.

Example 44 includes the subject matter of any one of Examples 37-43, and optionally, wherein the instructions result in transmitting the packet as a single-carrier transmission with a repetition factor of two over a directional multi-gigabit (DMG) channel.

Example 45 includes the subject matter of Example 44, and optionally, wherein the instructions result in selecting for another packet a scrambling seed independent of a number of codewords in the another packet, and transmitting the another packet with a repetition factor of one.

Example 46 includes the subject matter of any one of Examples 37-45, and optionally, wherein the instructions result in transmitting the packet with a Modulation and Coding Scheme (MCS) index of one over a directional multi-gigabit (DMG) channel.

Example 47 includes the subject matter of Example 46, and optionally, wherein the instructions result in selecting for another packet a scrambling seed independent of a number of codewords in the another packet, and transmitting the another packet with a MCS index different from one.

Example 48 includes the subject matter of any one of Examples 37-47, and optionally, wherein the selected scrambling seed comprises seven bits, wherein the packet comprises a directional multi-gigabit (DMG) packet, and wherein the periodic sequence of scrambling bits has a length of 127 bits.

Example 49 includes an apparatus of wireless communication, the apparatus comprising means for selecting a selected scrambling seed based on a number of codewords in a packet; means for scrambling bits of the packet based on a periodic sequence of scrambling bits, the sequence of scrambling bits being generated according to the selected scrambling seed; and means for transmitting the packet.

Example 50 includes the subject matter of Example 49, and optionally, wherein a codeword of the packet includes a first plurality of scrambled bits followed by a second plurality of re-scrambled bits, the first plurality of scrambled bits including a plurality of information bits being scrambled by scrambling bits of the sequence of scrambling bits, the second plurality of re-scrambled bits including the first plurality of scrambled bits being scrambled by a predefined re-scrambling sequence resulting from a predefined re-scrambling seed.

Example 51 includes the subject matter of Example 50, and optionally, wherein the sequence of scrambling bits includes a plurality of subsequences of scrambling bits, each subsequence of scrambling bits to be applied to a respective codeword of the codewords, and wherein each subsequence of scrambling bits is different from the predefined re-scrambling sequence.

Example 52 includes the subject matter of any one of Examples 49-51, and optionally, wherein the sequence of scrambling bits includes a plurality of subsequences of scrambling bits, each subsequence of scrambling bits to be applied to a respective codeword of the codewords, and wherein a beginning of each subsequence of scrambling bits is different from the sequence "1111111".

Example 53 includes the subject matter of any one of Examples 49-52, and optionally, comprising means for selecting a set of allowed scrambling seeds based on the number of the codewords, and selecting the selected scrambling seed from the set of allowed scrambling seeds.

Example 54 includes the subject matter of Example 53, and optionally, comprising means for selecting the set of allowed scrambling seeds from a plurality of predefined scrambling seeds.

Example 55 includes the subject matter of any one of Examples 49-54, and optionally, comprising means for transmitting a header of the packet, the header having a scrambler initialization field including the selected scrambling seed.

Example 56 includes the subject matter of any one of Examples 49-55, and optionally, comprising means for transmitting the packet as a single-carrier transmission with a repetition factor of two over a directional multi-gigabit (DMG) channel.

Example 57 includes the subject matter of Example 56, and optionally, comprising means for selecting for another packet a scrambling seed independent of a number of codewords in the another packet, and transmitting the another packet with a repetition factor of one.

Example 58 includes the subject matter of any one of Examples 49-57, and optionally, comprising means for transmitting the packet with a Modulation and Coding Scheme (MCS) index of one over a directional multi-gigabit (DMG) channel.

Example 59 includes the subject matter of Example 58, and optionally, comprising means for selecting for another packet a scrambling seed independent of a number of codewords in the another packet, and transmitting the another packet with a MCS index different from one.

Example 60 includes the subject matter of any one of Examples 49-59, and optionally, wherein the selected scrambling seed comprises seven bits, wherein the packet comprises a directional multi-gigabit (DMG) packet, and wherein the periodic sequence of scrambling bits has a length of 127 bits.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A wireless communication unit comprising circuitry and logic configured to:
   select a selected scrambling seed based on a number of codewords in a packet to be transmitted by said wireless communication unit;
   scramble bits of said packet based on a periodic sequence of scrambling bits, said sequence of scrambling bits to be generated according to said selected scrambling seed, wherein a codeword of said packet comprises a first plurality of scrambled bits followed by a second plurality of re-scrambled bits, said first plurality of scrambled bits comprising a plurality of information bits scrambled by scrambling bits of said sequence of scrambling bits, said second plurality of re-scrambled bits comprising said first plurality of scrambled bits scrambled by a predefined re-scrambling sequence resulting from a predefined re-scrambling seed; and
   cause transmission of the packet.

2. The wireless communication unit of claim 1, wherein said sequence of scrambling bits includes a plurality of subsequences of scrambling bits, each subsequence of scrambling bits to be applied to a respective codeword of said codewords, and wherein each subsequence of scrambling bits is different from said predefined re-scrambling sequence.

3. The wireless communication unit of claim 1, wherein said sequence of scrambling bits includes a plurality of subsequences of scrambling bits, each subsequence of scrambling bits to be applied to a respective codeword of said codewords, and wherein a beginning of each subsequence of scrambling bits is different from the sequence "1111111".

4. The wireless communication unit of claim 1 configured to select a set of allowed scrambling seeds based on the number of said codewords, and to select said selected scrambling seed from said set of allowed scrambling seeds.

5. The wireless communication unit of claim 4 configured to select said set of allowed scrambling seeds from a plurality of predefined scrambling seeds.

6. The wireless communication unit of claim 1, wherein said wireless communication unit is to transmit a header of said packet, the header having a scrambler initialization field including said selected scrambling seed.

7. The wireless communication unit of claim 1, wherein said wireless communication unit is to transmit said packet as a single-carrier transmission with a repetition factor of two over a directional multi-gigabit (DMG) channel.

8. The wireless communication unit of claim 7, wherein said wireless communication unit is to transmit another packet with a repetition factor of one, and to select for the another packet a scrambling seed independent of a number of codewords in said another packet.

9. The wireless communication unit of claim 1, wherein said wireless communication unit is to transmit said packet with a Modulation and Coding Scheme (MCS) index of one over a directional multi-gigabit (DMG) channel.

10. The wireless communication unit of claim 9, wherein said wireless communication unit is to transmit another packet with a MCS index different from one, and to select for the another packet a scrambling seed independent of a number of codewords in said another packet.

11. The wireless communication unit of claim 1, wherein said packet comprises a directional multi-gigabit (DMG) packet, wherein said selected scrambling seed comprises seven bits, and wherein said periodic sequence of scrambling bits has a length of 127 bits.

12. A wireless communication system comprising:
at least one antenna to transmit a packet;
a memory;
a processor; and
a wireless communication unit to select a selected scrambling seed based on a number of codewords in said packet, and to scramble bits of said packet based on a periodic sequence of scrambling bits, said sequence of scrambling bits to be generated according to said selected scrambling seed, a codeword of said packet comprising a first plurality of scrambled bits followed by a second plurality of re-scrambled bits, said first plurality of scrambled bits comprising a plurality of information bits scrambled by scrambling bits of said sequence of scrambling bits, said second plurality of re-scrambled bits comprising said first plurality of scrambled bits scrambled by a predefined re-scrambling sequence resulting from a predefined re-scrambling seed.

13. The wireless communication system of claim 12, wherein said sequence of scrambling bits includes a plurality of subsequences of scrambling bits, each subsequence of scrambling bits to be applied to a respective codeword of said codewords, and wherein each subsequence of scrambling bits is different from said predefined re-scrambling sequence.

14. The wireless communication system of claim 12, wherein said sequence of scrambling bits includes a plurality of subsequences of scrambling bits, each subsequence of scrambling bits to be applied to a respective codeword of said codewords, and wherein a beginning of each subsequence of scrambling bits is different from the sequence "1111111".

15. The wireless communication system of claim 12, wherein said wireless communication unit is to select a set of allowed scrambling seeds based on the number of said codewords, and to select said selected scrambling seed from said set of allowed scrambling seeds.

16. A method of wireless communication, the method comprising:
selecting a selected scrambling seed based on a number of codewords in a packet;
scrambling bits of said packet based on a periodic sequence of scrambling bits, said sequence of scrambling bits to be generated according to said selected scrambling seed, a codeword of said packet comprising a first plurality of scrambled bits followed by a second plurality of re-scrambled bits, said first plurality of scrambled bits comprising a plurality of information bits scrambled by scrambling bits of said sequence of scrambling bits, said second plurality of re-scrambled bits comprising said first plurality of scrambled bits scrambled by a predefined re-scrambling sequence resulting from a predefined re-scrambling seed; and
transmitting said packet.

17. The method of claim 16, wherein said sequence of scrambling bits includes a plurality of subsequences of scrambling bits, each subsequence of scrambling bits to be applied to a respective codeword of said codewords, and wherein each subsequence of scrambling bits is different from said predefined re-scrambling sequence.

18. The method of claim 16 comprising selecting a set of allowed scrambling seeds based on the number of said codewords, and selecting said selected scrambling seed from said set of allowed scrambling seeds.

19. A product including a non-transitory storage medium having stored thereon instructions that, when executed by a machine, result in:
selecting a selected scrambling seed based on a number of codewords in a packet;
scrambling bits of said packet based on a periodic sequence of scrambling bits, said sequence of scrambling bits to be generated according to said selected scrambling seed, a codeword of said packet comprising a first plurality of scrambled bits followed by a second plurality of re-scrambled bits, said first plurality of scrambled bits comprising a plurality of information bits scrambled by scrambling bits of said sequence of scrambling bits, said second plurality of re-scrambled bits comprising said first plurality of scrambled bits scrambled by a predefined re-scrambling sequence resulting from a predefined re-scrambling seed; and
transmitting said packet.

20. The product of claim 19, wherein said sequence of scrambling bits includes a plurality of subsequences of scrambling bits, each subsequence of scrambling bits to be applied to a respective codeword of said codewords, and wherein each subsequence of scrambling bits is different from said predefined re-scrambling sequence.

21. The product of claim 19, wherein said sequence of scrambling bits includes a plurality of subsequences of scrambling bits, each subsequence of scrambling bits to be applied to a respective codeword of said codewords, and wherein a beginning of each subsequence of scrambling bits is different from the sequence "1111111".

22. The product of claim 19, wherein said instructions result in selecting a set of allowed scrambling seeds based on the number of said codewords, and selecting said selected scrambling seed from said set of allowed scrambling seeds.

23. The product of claim 19, wherein said instructions result in transmitting said packet as a single-carrier transmission with a repetition factor of two over a directional multi-gigabit (DMG) channel.

24. The product of claim 19, wherein said instructions result in transmitting said packet with a Modulation and Coding Scheme (MCS) index of one over a directional multi-gigabit (DMG) channel.

* * * * *